United States Patent [19]
Norton et al.

[11] 3,936,028
[45] Feb. 3, 1976

[54] FLUSH VALVE

[75] Inventors: Ian Fredric Norton, Toronto, Canada; James O'Grady, London, England

[73] Assignee: Crane Canada Limited, Montreal, Canada

[22] Filed: July 13, 1973

[21] Appl. No.: 378,835

[30] Foreign Application Priority Data
Aug. 2, 1972  Canada .................................. 148588

[52] U.S. Cl. ..................... 251/5; 251/43; 251/46; 251/61.1
[51] Int. Cl.² .......................................... F16K 31/385
[58] Field of Search ............ 251/46, 43, 33, 61.1, 5

[56] References Cited
UNITED STATES PATENTS

| | | | |
|---|---|---|---|
| 1,269,721 | 6/1918 | Kuntny | 251/46 X |
| 1,731,571 | 10/1929 | Heare | 251/46 |
| 2,026,916 | 1/1936 | Smith | 251/46 |
| 2,217,166 | 10/1940 | Groeniger | 251/43 |

FOREIGN PATENTS OR APPLICATIONS

| | | | |
|---|---|---|---|
| 672,023 | 10/1963 | Canada | 251/61.1 |

*Primary Examiner*—Arnold Rosenthal
*Attorney, Agent, or Firm*—Fetherstonhaugh & Co.

[57] ABSTRACT

In one embodiment, a valve body contains a flexible valve sleeve between a fluid inlet and a fluid outlet, and an annular chamber around the sleeve connects with the inlet so that fluid pressure in the chamber normally compresses the sleeve to a closed position. A manually operated pilot valve reduces pressure in the chamber so that the sleeve is expanded by fluid pressure from the inlet to open the valve.

In another embodiment, a valve body contains a flexible diaphragm which normally closes an inlet valve port and defines a pressure chamber isolated from a fluid outlet. A manually operated pilot valve reduces pressure in the chamber so that the diaphragm is unseated from the inlet port by fluid pressure from the inlet to open the valve.

6 Claims, 3 Drawing Figures

FLUSH VALVE

This invention relates to new and useful improvements in flush valves or metering valves of the general type wherein fluid flow through the valve is normally blocked and commences upon manual actuation of a pilot valve, the flow then continuing for a desired period of time after actuation of the pilot valve ceases.

The principal object of the invention is to provide a flush valve of this type which is simple in construction, efficient in operation and capable of long service without requiring maintenance or replacement.

As such, one embodiment of the invention utilizes a valve body with a flexible valve sleeve therein, the sleeve being normally kept closed by fluid pressure in a chamber which surrounds the sleeve. However, the pressure in the chamber may be reduced by manual actuation of a pilot valve and fluid pressure at the inlet of the valve expands the flexible sleeve and fluid flows therethrough. After the pilot valve closes, the main fluid flow through the valve still continues until fluid pressure in the chamber gradually builds up to again close the valve sleeve.

A modified embodiment of the invention utilizes a flexible diaphragm in the valve body, normally covering an inlet port on one side, under the pressure of fluid in a chamber at the other side of the diaphragm. When pressure in the chamber is reduced by manual actuation of a pilot valve, the diaphragm is unseated by fluid pressure through the inlet port and fluid flows through the valve until after the pilot valve is closed and pressure in the chamber gradually builds up and the diaphragm again closes the inlet port.

With the foregoing more important object and features in view and such other objects and features which may become apparent as this specification proceeds, the invention will be understood from the following description taken in conjunction with the accompanying drawings, wherein like characters of reference designate like parts and wherein.

Figure 1:
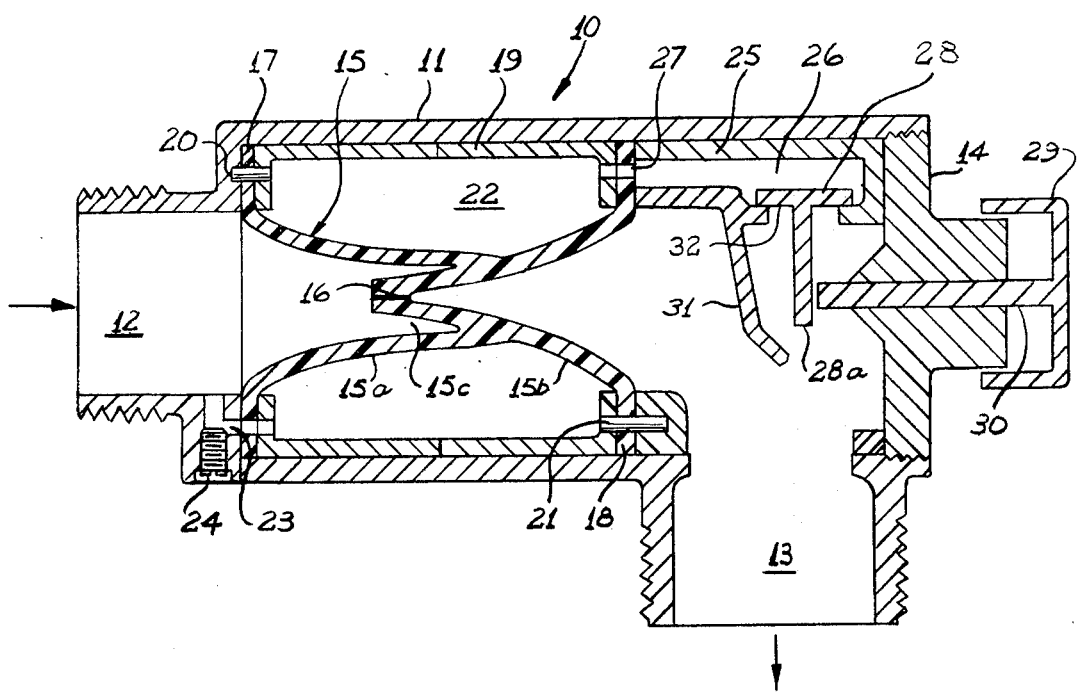
FIG. 1 is a longitudinal sectional view showing the preferred embodiment of the invention.

Referring now to the accompanying drawings in detail, more particularly to FIG. 1, the numeral 10 generally designates a flush valve or metering valve of the invention. The same comprises a valve body 11 having a fluid inlet 12 and a fluid outlet 13. Conveniently, the inlet 12 may be at one end of the valve body and the outlet 13 may project laterally from the other end portion of the body where the body is provided with a removable end wall 14 to facilitate assembly of the valve components hereinafter described.

The valve body 11 contains a flexible valve sleeve designated generally by the numeral 15. This is formed integrally from suitable elastomeric material and includes funnel-shaped inlet and outlet portions 15a, 15b, respectively, and a central valve portion 15c. The portions 15a, 15b merge longitudinally inwardly toward the center of the sleeve and the portion 15c, which is a longitudinal continuation of the outlet portion 15b, is re-entrant in the inlet portion 15a, as will be apparent from the drawing. The central portion 15c is provided with a normally closed slit 16.

The ends of the sleeve portions 15a, 15b terminate in out-turned flanges 17, 18 which overlap the ends of a spacer ring 19 and may be fastened thereto by suitable pins 20, 21. The ring 19 defines an annular chamber 22 around the valve sleeve 15, and a duct 23 communicates this chamber with the fluid inlet 12. The duct 23 extends through the valve body, through the sleeve flange 17 and through the adjacent end of the ring 19, and an adjusting screw 24 regulates the flow of fluid through the duct.

The portion of the valve body downstream from the valve sleeve 15 contains an insert 25 having a chamber 26 therein which communicates with the chamber 22 through a passage 27. The passage 27 extends through the sleeve flange 18 and through the adjacent end of the spacer ring 19, and the pins 21 which hold the flange 18 to the ring may also hold the ring 19 and the sleeve 15 to the insert 25, so that all these components may be unitarily inserted into the valve body during assembly, when the end wall 14 is not in place.

The insert 25 is provided with a pilot valve port 32 which is normally closed by a pilot valve member 28. The member 28 is rockable on the valve port and when it is unseated, the chamber 26 in the insert 25 communicates with the interior of the valve body downstream from the valve sleeve 15, that is, with the fluid outlet 13.

A suitable projection or baffle 31 may be provided at the inside of the insert 25 adjacent the pilot valve port 32 to act as a flow divider, so that fluid passing through the valve sleeve 15 to the outlet 13 does not materially interfere with fluid flow from the chamber 26 through the port 32 to the outlet 13.

The pilot valve member 28 is actuated manually by a push button 29 disposed outside of the body end wall 14. The button is carried by a shaft 30 which slides through the end wall 14 in a direction transverse to a stem 28a rigid with the valve member 28. The stem 28a projects through the valve port 32 for engagement by the inner end of the shaft 30, it being apparent that when the button 29 is depressed, the shaft 30 will tilt the stem 28a to rock the valve member 28 into a tilted position on the valve seat 27 and thus open the pilot valve so that fluid may flow from the chamber 26 to the outlet 13.

In operation, the valve is normally closed and flow of fluid from the inlet 12 through the valve sleeve 15 is blocked. This is due to the fact that fluid pressure at the inlet 12 also exists in the annular chamber 22 and in the chamber 26 while the pilot valve member 28 is closed, and because the fluid under pressure in the annular chamber 22 engages a greater outside surface of the flexible valve sleeve 15 than is engaged by fluid within the inlet portion 15a of the sleeve, the sleeve is compressed by fluid pressure in the chamber 22 and the slit 16 in the sleeve portion 15c is closed to block fluid flow through the valve.

However, when the push button 29 is manually depressed to open the pilot valve member 28, fluid escapes from the chamber 22 and 26 through the port 32 to the outlet 13 and the pressure of fluid in the chamber 22 is reduced to below that of the fluid in the inlet portion 15a of the valve sleeve. This causes the valve sleeve to expand and the slit 16 to become opened, so that fluid flows from the inlet 12 through the valve sleeve 15 to the outlet 13 and the valve is open.

When the push button 29 is released, the pilot valve member 28 again closes the valve port 32, but fluid flow through the valve sleeve 15 still continues until pressure in the annular chamber 22 builds up sufficiently to again compress and close the valve sleeve. The time interval required to do this, and consequently the amount of fluid which passes through the valve after releasing of the button 29, may be adjusted by means of the screw 24 which regulates the rate of fluid flow from the inlet 12 through the duct 23 into the chamber 22.

Figure 2:
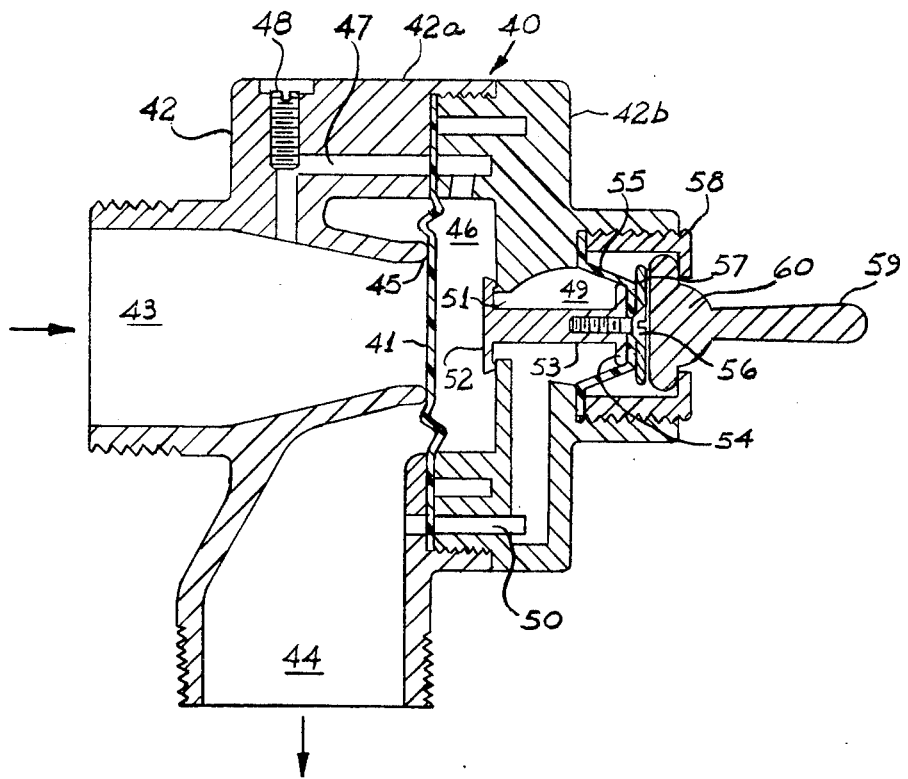
FIG. 2 is a longitudinal sectional view of a modified embodiment.

The modified embodiment of the valve shown in FIG. 2 and generally designated as 40 is very similar in operation to the embodiment 10 but has a different structural arrangement which, instead of the aforementioned flexible valve sleeve 15, utilizes a flexible diaphragm 41. In this instance the valve body 42 consists of two complemental sections 42a and 42b which are separably held together and have the diaphragm 41 clamped therebetween. The body section 42a has a fluid inlet 43 and a fluid outlet 44 at right angles to each other, and the inlet 43 defines a main valve port 45 which is normally closed by the diaphragm. On the other side of the diaphragm 41, a pressure chamber 46 exists in the body section 42b, the chamber 46 being isolated from the outlet 44, but communicating with the inlet 43 through a duct 47. A flow regulating screw 48 is provided in the duct, and it will be understood that the area of the diaphragm 41 exposed to fluid pressure in the chamber 46 is greater than that exposed to the pressure in the inlet 43 at the port 45, so that the diaphragm is normally pressed against the port 45 and the valve is closed.

The body section 42b is also provided with a pilot valve chamber 49 which discharges to the outlet 44 through a duct or passage 50 and which communicates with the chamber 46 through a pilot valve port 51. The latter is normally closed by a pilot valve member 52 at one end of a stem 53, the other end of which is provided with an enlarged head 54.

A flexible seal or gasket 55 is secured to the head 54 by a screw 56 and washer 57, the peripheral portion of the gasket 55 being clamped in the body section 42b by a threaded sleeve or nut 58. The pilot valve actuating means comprise a tiltable lever 59 having a substantially semi-pherical inner portion 60 rockably diposed within the nut 58 and immediately adjacent the washer 57, so that when the lever 59 is tilted in any direction, the portion 60 presses against the washer 57 and slides the stem 53 inwardly to unseat the valve member 53 from the valve port 51.

When this occurs, fluid escapes from the pressure chamber 46 through the port 51 into the pilot valve chamber 49 and through the duct 50 to the outlet 44. The fluid pressure in the chamber 46 is thus reduced to a value below that in the inlet 43, and the inlet pressure acting on the diaphragm 41 through the port 45 causes the diaphragm to become deflected from the port 45, thus opening the port and permitting fluid to flow from the inlet 43 to the outlet 44 in the open position of the valve.

When the actuating lever 59 is released, fluid still continues to flow through the valve until pressure again builds up in the chamber 46 and the diaphragm 41 again closes the inlet port 45, the time interval required for this being adjustable by means of the flow regulating screw 48 in the duct 47.

It is particularly interesting to note that the valve 40 is easy to assemble and has a novel disposition of parts relative to each other in that there is an axial alignment of the inlet 43, inlet port 45, diaphragm 41, chambers 46 and 49, pilot valve member 52 and the actuating lever 59. The pilot valve member 52 with its associated parts 53, 54, 55, 56 and 57 may be readily installed in the body section 42b when the nut 58 is not in place. The lever portion 60 may then be inserted in the nut, and when the nut is applied to the body section 42b, the gasket 55 is automatically clamped in place and the various components are held in their proper position.

It may be also noted that in both embodiments of the invention it is not necessary to employ springs, or the like, to keep the valve normally closed, since this is done by the fluid pressure itself until such time as the pilot valve mechanism is manually actuated. Also, springs are not needed in the pilot valve mechanism. In the embodiment 10 of FIG. 1 the pilot valve member 28 is normally held against the seat 27 by fluid pressure in the chamber 26. In the embodiment of FIG. 2, the fluid pressure in the chamber 46 normally holds the pilot valve member 52 against the seat 51.

Figure 3:
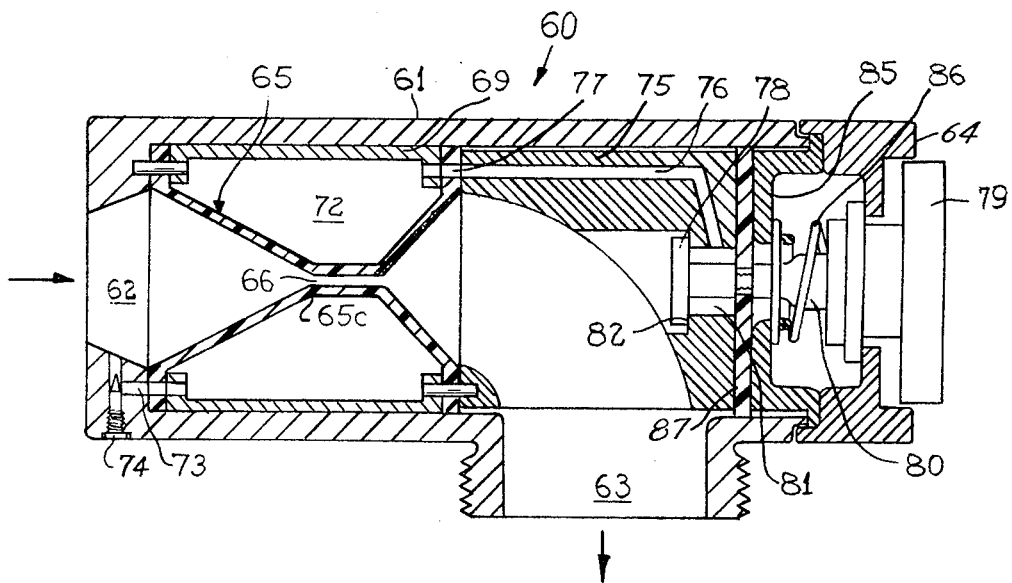
FIG. 3 is a longitudinal sectional view of another modified embodiment.

FIG. 3 shows another modified embodiment which is designated by the general reference numeral 60. This embodiment is very similar to the embodiment 10 of FIG. 1, but the pilot valve member is provided on the actuating shaft rather than being separate therefrom. To the extent that the embodiments 10 and 60 are similar, the description of embodiment 60 need not be repeated in detail.

However, in general terms, it will be noted that the embodiment 60 comprises a valve body 61 having a fluid inlet 62 and a fluid outlet 63, the outlet being located at one side of the body and the end of the body opposite from the inlet 62 being equipped with a removable end wall 64. The body 61 contains a flexible valve sleeve 65 of elastomeric material, including a central valve portion 65c, with a normally closed slit 66. A spacer ring 69 defines an annular chamber 72 around the sleeve 65. A duct 73 communicates the chamber 72 with the fluid inlet 62 and a flow adjusting screw 74 is provided in the duct.

An insert 75 is provided in the valve body downstream from the sleeve 65 and has a chamber 81 which communicates with the chamber 72 through passages 76, 77. The chamber 81 has a valve port 82 which is normally closed by a pilot valve member 78, but when the valve member is unseated, the chamber 81 communicates through the port 82 with the interior of the valve body downstream from the valve sleeve 65, that is, with the fluid outlet 63.

The pilot valve member 78 is actuated manually by a push button 79 disposed outside of the body end wall 64, the button having a shaft or stem 80 to which the valve member 78 is secured. It will be noted that the member 78, button 79 and shaft 80 are disposed coaxially on the longitudinal axis of the valve body, their sliding movement being in the direction of that axis. A spring seat 85 may be provided in the valve body inside of the end cap 64 and a compression spring 86 reacts between this seat and the button 79 to bias the shaft 80 outwardly, thus normally urging the valve member 78 to its closed position on the port 82. A flexible gasket 87 may be provided on the shaft 80 between the insert 75 and the spring seat 85 to prevent leakage, it being understood that the gasket is deflectable to facilitate sliding of the shaft 80 when the push button 79 is actuated.

Upon pushing the button 79 inwardly, the pilot valve member 78 is unseated from the port 82 so that fluid escapes from the chamber 72 through the passages 77, 76 into the chamber 81 and then through the open port 82 to the outlet 63. As in the embodiment 10, this causes the valve sleeve 65 to expand and the slit 66 to become opened, so that fluid flows from the inlet 62 to the outlet 63 in the open position of the valve.

When finger pressure on the push button 79 is removed, the spring 86 returns the pilot valve member 78 to its closed position on the valve port 82, so that fluid flow through the passages 77, 76 from the chamber 72 into the chamber 81 is stopped. However, fluid flow through the valve sleeve 65 still continues until pressure in the chamber 72 builds up sufficiently to compress the sleeve 65 and close the flow through the valve, as already described in connection with embodiment 10.

Thus, in substance, the construction and operation of the embodiment 60 in FIG. 3 is the same as that of embodiment 10 of FIG. 1, the primary difference between the two being that in embodiment 10 the pilot valve member 28, 28a is separate from and disposed transversely to the push button shaft 30 and is rockable on the valve port 32. On the other hand, in embodiment 60, the pilot valve member 78 is carried by and coaxial with the push button shaft 80 and becomes opened or closed by axial movement in relation to the valve port 82.

While in the foregoing there have been described and shown three different embodiments of the invention, various modifications and equivalents may be resorted to within the spirit and scope of the invention as claimed.

The embodiments of the invention in which an exclusive property or privilege is claimed are defined as follows:

1. A flush valve comprising a valve body having a fluid inlet and a fluid outlet, a flexible valve sleeve provided in said body between said inlet and outlet, said flexible valve sleeve being integrally formed and comprising funnel-shaped inlet and outlet portions merging longitudinally inwardly toward the center of the sleeve, and a central valve portion which constitutes a longitudinal continuation of said outlet portion and is re-entrant in the inlet portion, said central valve portion being provided with a normally closed slit, an annular chamber formed in said body around said sleeve, a duct communicating said annular chamber with said inlet whereby fluid pressure in said chamber may normally compress said sleeve to prevent fluid flow therethrough to said outlet, a secondary chamber provided in said body downstream from said sleeve and communicating with said annular chamber, said secondary chamber having a pilot valve port communicating with said fluid outlet, a normally closed pilot valve member cooperating with said pilot valve port, and actuating means operable from the exterior of said body to open said pilot valve member, whereby fluid pressure in said secondary chamber and said annular chamber may be reduced and said flexible valve sleeve may be expanded by fluid pressure from said inlet to facilitate fluid flow through the valve.

2. The device as defined in claim 1 together with a flow regulating screw provided in said duct.

3. The device as defined in claim 1 together with an insert positioned in said body downstream from said sleeve, said insert defining said secondary chamber.

4. The device as defined in claim 1 wherein said pilot valve member is tiltable on said valve port and includes a stem projecting outwardly from said secondary chamber through said port, said actuating means including a shaft slidable through a wall of said body in a direction transverse to said stem and engageable with the stem for tilting said pilot valve member.

5. The device as defined in claim 1 wherein said pilot valve member is slidable axially relative to said pilot valve port, said actuating means including a shaft slidable through a wall of said housing in a direction coaxial with the sliding movement of said pilot valve member and having the pilot valve member mounted thereon.

6. The device as defined in claim 5 together with resilient means biasing said shaft in a direction to urge said pilot valve member to its closed position on said pilot valve port.

* * * * *